United States Patent
Madaiah

(10) Patent No.: US 9,565,054 B2
(45) Date of Patent: Feb. 7, 2017

(54) FATE SHARING SEGMENT PROTECTION

(75) Inventor: Kumar Vinod Madaiah, Bangalore (IN)

(73) Assignee: TEJAS NETWORKS LIMITED, Bangalore (IN)

(*) Notice: Subject to any disclaimer, the term of this patent is extended or adjusted under 35 U.S.C. 154(b) by 182 days.

(21) Appl. No.: 14/008,073

(22) PCT Filed: Aug. 11, 2011

(86) PCT No.: PCT/IN2011/000541
§ 371 (c)(1),
(2), (4) Date: Dec. 8, 2013

(87) PCT Pub. No.: WO2012/131696
PCT Pub. Date: Oct. 4, 2012

(65) Prior Publication Data
US 2014/0126350 A1 May 8, 2014

(30) Foreign Application Priority Data

Mar. 31, 2011 (IN) .......................... 1080/CHE/2011

(51) Int. Cl.
*H04L 12/703* (2013.01)
*H04L 12/24* (2006.01)
*H04L 12/707* (2013.01)
*H04L 1/22* (2006.01)

(52) U.S. Cl.
CPC ............. *H04L 41/0668* (2013.01); *H04L 1/22* (2013.01); *H04L 45/22* (2013.01); *H04L 45/28* (2013.01)

(58) Field of Classification Search
None
See application file for complete search history.

(56) References Cited

U.S. PATENT DOCUMENTS

| | | | |
|---|---|---|---|
| 7,900,250 B1* | 3/2011 | Fedyk et al. | 726/15 |
| 8,929,203 B2* | 1/2015 | Ding et al. | 370/225 |
| 2010/0049868 A1* | 2/2010 | Ginsberg et al. | 709/242 |
| 2010/0290367 A1* | 11/2010 | Karandikar et al. | 370/256 |
| 2011/0128861 A1* | 6/2011 | Ding et al. | 370/241.1 |
| 2012/0096182 A1* | 4/2012 | Gan | 709/239 |
| 2012/0188867 A1* | 7/2012 | Fiorone et al. | 370/218 |
| 2013/0100801 A1* | 4/2013 | Allan et al. | 370/228 |
| 2013/0216217 A1* | 8/2013 | Sharma et al. | 398/8 |
| 2013/0219252 A1* | 8/2013 | Satyarthi et al. | 714/799 |
| 2013/0343179 A1* | 12/2013 | Madaiah et al. | 370/222 |
| 2014/0019799 A1* | 1/2014 | Satyarthi et al. | 714/4.11 |
| 2014/0177432 A1* | 6/2014 | Madaiah et al. | 370/218 |
| 2015/0092588 A1* | 4/2015 | Ding et al. | 370/252 |

* cited by examiner

*Primary Examiner* — Bunjob Jaroenchonwanit
(74) *Attorney, Agent, or Firm* — Brundidge & Stanger, P.C.

(57) ABSTRACT

The present invention relates to a method and system of fate sharing segment protection. In one embodiment, this can be accomplished by monitoring the infrastructure segments, detecting a fault at the infrastructure segment, provisioning protection group between the source node and the destination node as outer work and outer protect (Outer Protection Group, OPG), and between at least two intermediate nodes as inner work and inner protect (Inner Protection Group IPG) and provisioning at least one supplementary outer protect on the same port of the OPG nodes where the OPG is provisioned, such that the outer supplementary protect diverge in such a way that mirrors the behavior (or shares the fate) of the inner work and inner protect.

8 Claims, 5 Drawing Sheets

US 9,565,054 B2

FATE SHARING SEGMENT PROTECTION

FIELD OF THE INVENTION

The present invention relates to a protection switching for use in a communication network, and more particularly, to a method and a system for protection switching provision by a fate sharing protection group in a communication network.

BACKGROUND OF THE INVENTION

Communication networks are becoming widely used for distributing both high and low speed data over varying distances. Typically, a communication network is comprised of a number of network elements (for example Nodes, switches, routers etc) that are connected to each other in a variety of configurations so as to form a unified communication network. The communication network may extend over a small area, such as a company wide network, or may cover large distances, such as in regional or nationwide networks. The nodes allow network clients to input data for transmission over the network and to receive data transmitted over the network from other locations. Thus, data may be added to, or dropped from the network at node locations, as the data flows from point to point throughout the network.

One problem associated with communication networks is the problem of protection switching. In one situation, protection switching involves the process of switching network traffic from one network transmission path to another in the event of a network failure.

In another protection switching technique, typically used in ring networks, the network traffic is transmitted over working and protection transmission paths that flow in different directions over the network to the same destination. In the event of a network failure, either the working or protection transmission path will be selected to deliver the network traffic to the network element at the final destination. To ensure uninterrupted (continuous) traffic flow a protection group (PG) is provisioned at each node where at least one working and at least one protection elements are presented at every node. FIG. 1 shows an example illustration of the protection group (PG) as defined in Provide Bridge Backbone Network with Traffic Engineering (PBB-TE, i.e. IEEE 802.1Qay) which has one work and one protect. Also, IEEE 802.1Qay defines two PGs are must i.e. one on source end and other on the destination end. Also, the work (protect) entity is bi-directional and path should be congruent between the two PGs.

FIG. 2 shows the working mechanism of protection group (PG) in a topology as discussed in FIG. 1. In FIG. 2, where one or more nodes are connected to form an individual segment. Each node is provisioned to check for the fault in their individual segment or the whole segment connecting N1 to N5 with intermediate nodes N2, N3 and N4. Considering the fault has occurred between nodes N2 and N3. Since, all the nodes are provisioned to protection group, the (inner) work segment between the nodes N2 and N3 fails, the node N2 switches the traffic to node N6 which is the protect segment between the nodes N2 and N3.

Node 1 also switches the traffic to node N7 to reach node N5 as (outer) work segment also flows through the same link N2 and N3 thereby encountering fault and hence no continuity check message corresponding to (outer) work segment of the nodes N1 to N5. Since inner protection group between N2 and N3 would have protected the traffic over inner protect and simultaneously outer protection group between N1 and N5 would have protected the traffic over node N7 which leads to double protection. Also, the coordination issue arises wherein the inner protection group has to send information about the fault to the outer protection group and request for a pause while taking the action at the inner level. Such coordinations are bandwidth consuming and are not easy to implement in existing nodes. Timer based methods where protection switching times in inner protection group is considerably smaller than protection switching times in outer protection group would increase the overall protection switching time of the network.

Therefore, it would be desirable to have a system to perform protection switching in a communication network to overcome the above restrictions.

SUMMARY OF THE INVENTION

An aspect of the present invention is to address at least the above-mentioned problems and/or disadvantages and to provide at least the advantages described below.

Accordingly, an aspect of the present invention is to provide a protection switching method for an infrastructure segment between a source node, at least one intermediate node and a destination node of a communication network, wherein the infrastructure segment is co-routed with at least one work or protect infrastructure segment of a Segment Protection Group (SPG), the method comprising monitoring the infrastructure segments, detecting a fault at the infrastructure segment, provisioning protection group between the source node and the destination node as outer work and outer protect (Outer Protection Group, OPG), and between at least two intermediate nodes as inner work and inner protect (Inner Protection Group IPG) and provisioning at least one supplementary outer protect on the same port of the OPG nodes where the OPG is provisioned, such that the outer supplementary protect diverge in such a way that mirrors the behavior (or shares the fate) of the inner work and inner protect.

In another aspect of the present invention is to provide a protection switching system of an infrastructure segment, wherein the infrastructure segment is co-routed over with at least one work or protect infrastructure segment of a Segment Protection Group (SPG), the system comprising at least one communication network and a plurality of nodes connected to each other in the communication network, wherein the plurality of nodes includes a source node, at least one intermediate node and a destination node, wherein each node of the communication network is configured for monitoring the infrastructure segments, detecting a fault at the infrastructure segment, provisioning protection group between the source node and the destination node as outer work and outer protect (Outer Protection Group, OPG), and between at least two intermediate nodes as inner work and inner protect (Inner Protection Group IPG) and provisioning at least one supplementary outer protect on the same port of the OPG nodes where the OPG is provisioned, such that the outer supplementary protect segment diverge in such a way that mirrors the behavior (or shares the fate) of the inner work and inner protect.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings in which.

Persons skilled in the art will appreciate that elements in the figures are illustrated for simplicity and clarity and may have not been drawn to scale. For example, the dimensions of some of the elements in the figure may be exaggerated relative to other elements to help to improve understanding of various exemplary embodiments of the present disclosure.

Throughout the drawings, it should be noted that like reference numbers are used to depict the same or similar elements, features, and structures.

DETAIL DESCRIPTION OF THE INVENTION

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Figure 1:
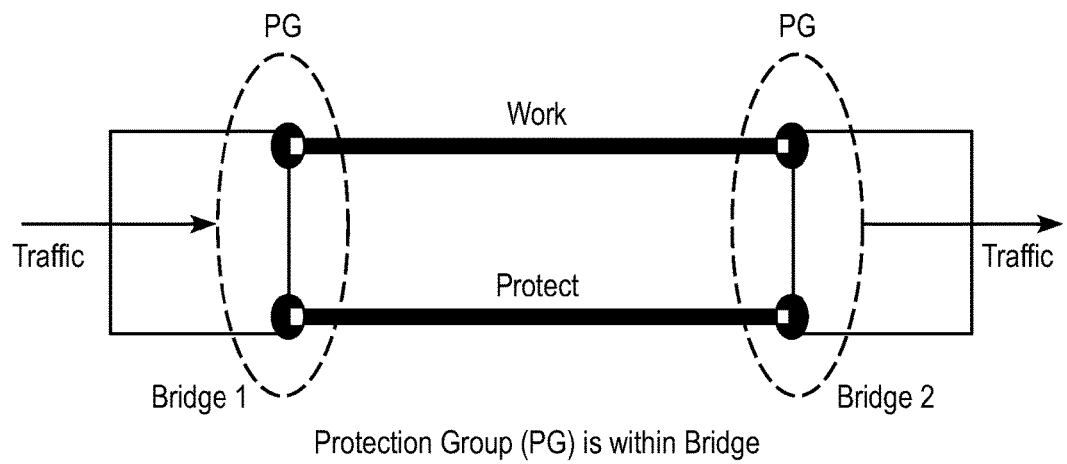
FIG. 1 shows an example of a protection group (PG) as defined in Provider Backbone Bridged Network with Traffic Engineering (PBB-TE, i.e. IEEE 802.1Qay).
Figure 2:
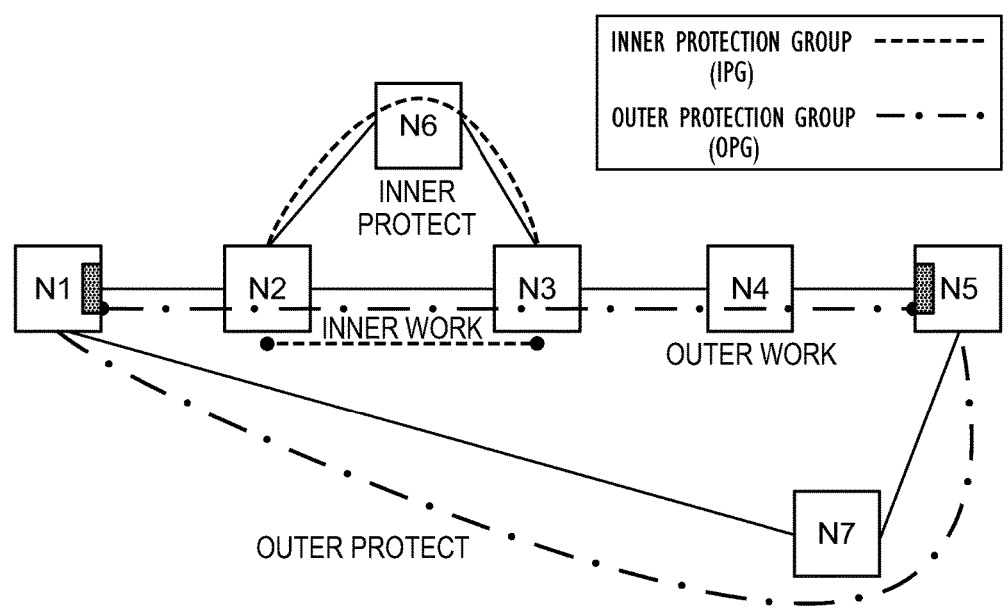
FIG. 2 shows conventional working mechanism of protection group (PG) in a topology as described in FIG. 1.
Figure 3:
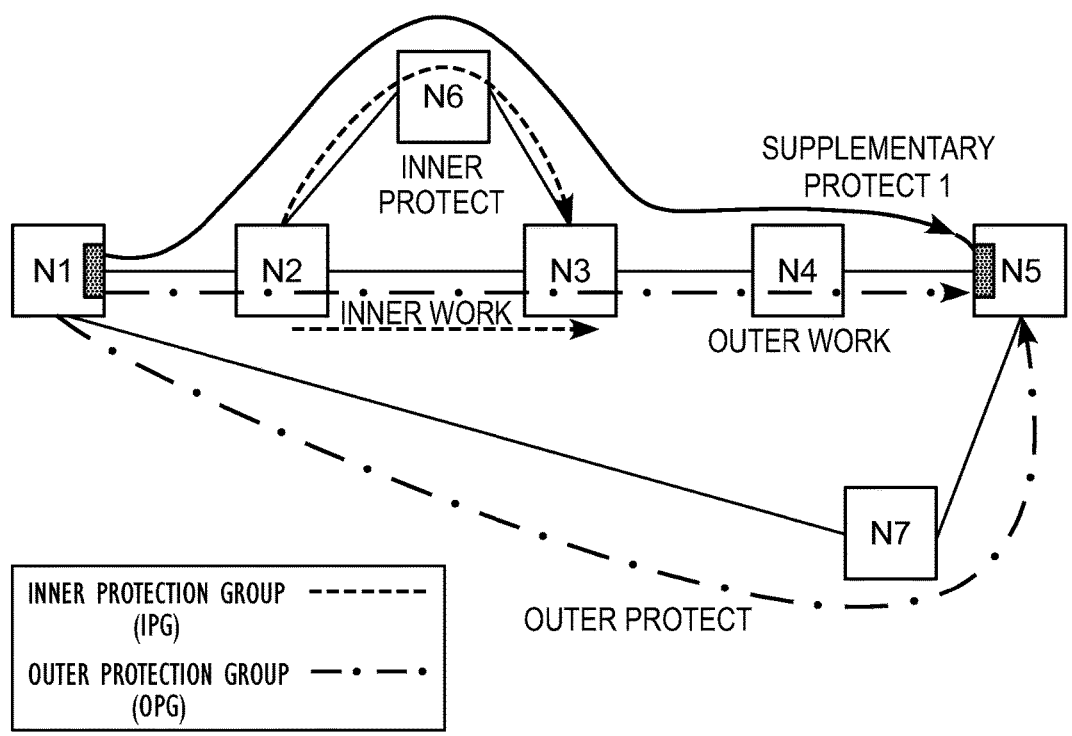
FIG. 3 shows example topology of a communication system as shown in FIG. 2, where fate sharing segment protection may be implemented in accordance with one embodiment of the invention.
Figure 4:
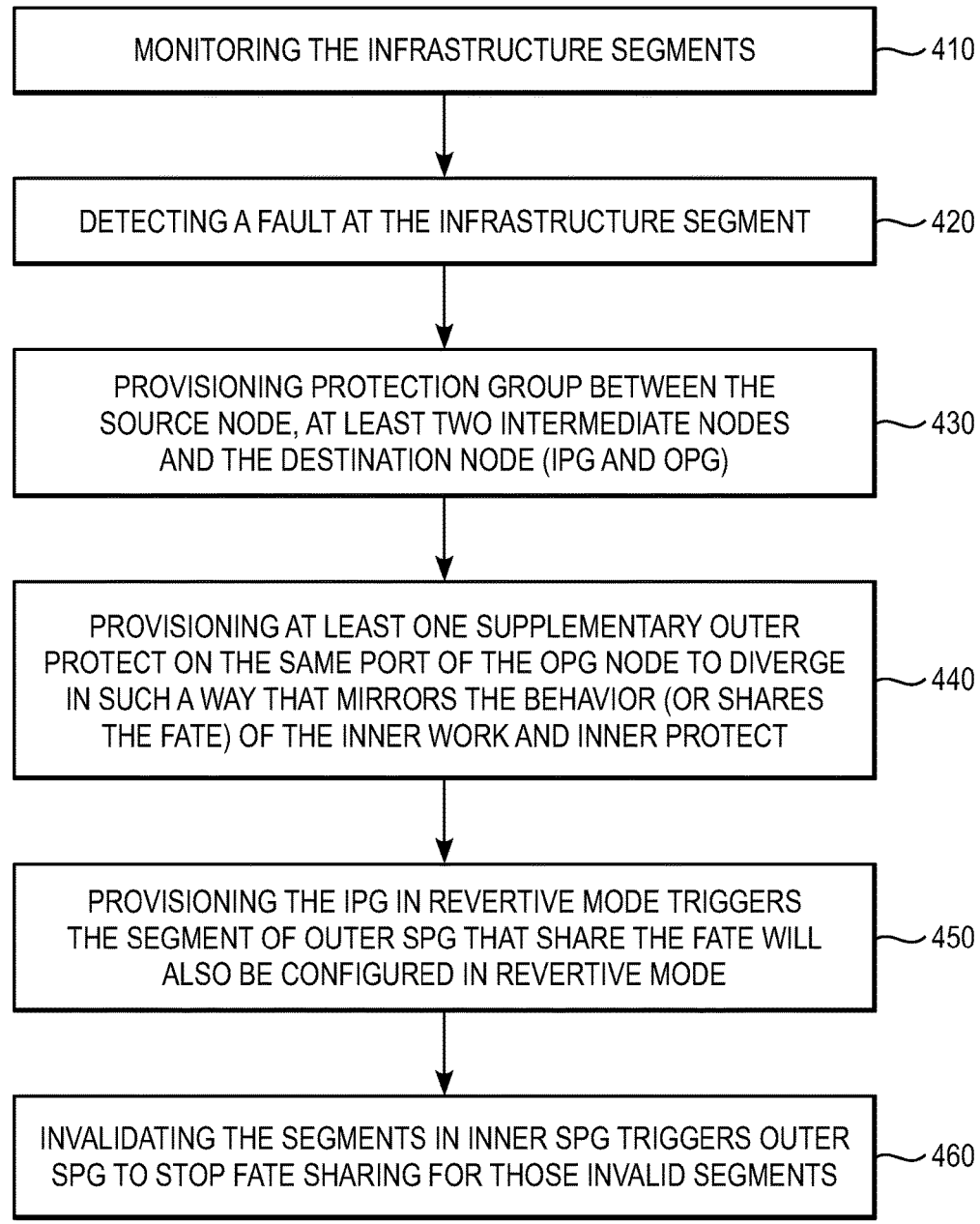
FIG. 4 shows a flow chart of a fate sharing segment protection switching method in accordance with one embodiment of the invention.
Figure 5:
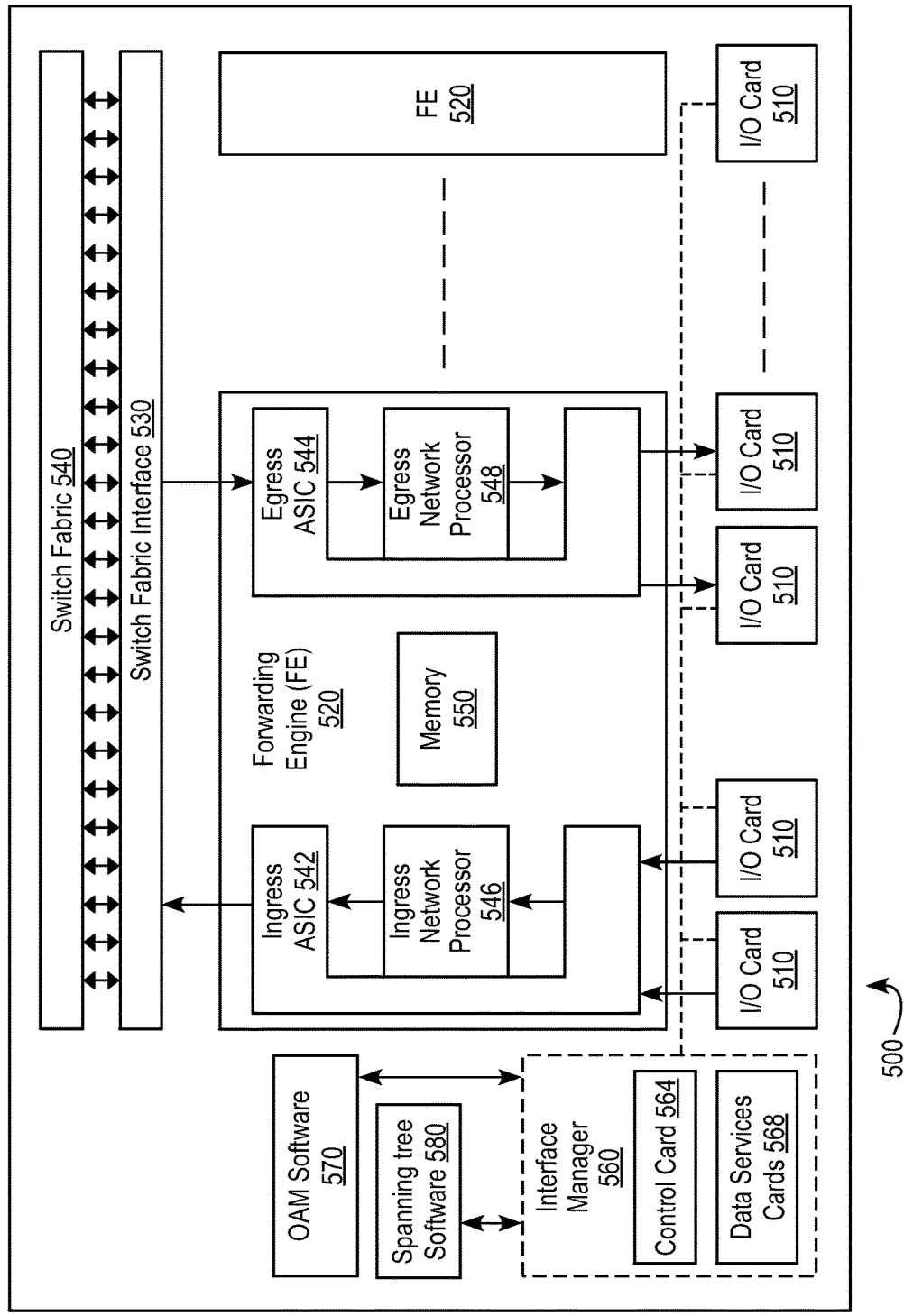
FIG. 5 is a functional block diagram of a network element according to an embodiment of the invention.

FIGS. 3 through 5, discussed below, and the various embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the invention. Terms first, second, and the like are used to differentiate between objects having the same terminology and are in no way intended to represent a chronological order, unless where explicitly stated otherwise. A set is defined as a non-empty set including at least one element.

FIG. 3 shows example topology of a communication system where fate sharing segment protection mechanism may be implemented in accordance with one embodiment of the invention. FIG. 3 includes a source node N1, at least one intermediate node (N2, N3, and N4) and a destination node N5. The infrastructure segment between the source node N1 and the destination node N5 is co-routed over with at least one work or protect infrastructure segment of a Segment Protection Group (SPG) i.e. between N2 and N3.

Each node is provisioned to check for the fault in their individual segment or the whole segment connecting N1 to N5 with intermediate nodes N2, N3 and N4. In an example operation, considering a fault has occurred between nodes N2 and N3. The fault detection in an example may mean absence of Continuity Check Message (CCMs) within a predetermined time period. All the nodes in the network are provisioned to support protection group, the work segment between the nodes N2 and N3 fails, the node N2 switches the traffic to node N6 which is the protect segment between the nodes N2 and N3.

Node 1 also switches the traffic to node N7 to reach node N5 as work segment also flows through the same link N2 and N3 thereby encountering fault and hence no continuity check message corresponding to work segment of the nodes N1 to N5. Since inner protection group between N2 and N3 would have protected the traffic over inner protect and simultaneously outer protection group between N1 and N5 would have protected the traffic over node N7. This problem can be solved by provisioning inner protection group (IPG) between nodes N2 and N3 with inner-work and inner-protect as its elements. Provision outer protection group (OPG) between nodes N1 and N5, where OPG has more than 1 protection entity (i.e.) m: 1 state-machine which can protect one work across m protection entity. In a protection group, when work entity fails traffic flowing along the work is re-directed along exactly one protect entity. When multiple protects are present in a protection group, they are prioritized using supplementary protect segment. In the present invention, for OPG, outer-work and supplementary protect are provisioned on the same port. But, they diverge in such a way that they traverse the same nodes as inner-work and inner-protect ("Forced Fate-sharing"). Further, if IPG is provisioned in revertive mode then only part of the entities of OPG that Fate-share with IPG are provisioned in revertive mode. Revertive mode means, if inner-work recovers from fault, then traffic is reversed or restored from inner-protect over to inner-work. Therefore, when in fate-share mode the outer-work and supplementary protect will mirror the behavior of IPG.

In the present case where link between nodes N2 and N3 fails, implies inner-work fails. Node 2 and 3 will trigger protection of traffic from inner-work to inner-protect. This is done by the IPG state machine. As outer-work also flows through the same link between the nodes Node 2 and Node 3, outer-work also encounters fault and hence no CCM corresponding to outer-work is received at node N1 and N5.

OPG will re-direct the traffic from the port through which outer-work flows to the port through which supplementary protect flows. Since, the method of protection switching has provisioned outer-work and supplementary protect on the same port, the traffic continues on the same port and thereby preventing double protection. Had there been no supplementary protection, then IPG would have protected the traffic over inner-protect and simultaneously OPG would have protected the traffic over outer-protect, leading to double protection. This double protection problem and different timer issue is addressed by ensuring fate-sharing between IPG and OPG. Fate-sharing means some or all segments of outer segment protection group will mirror the behavior of segments of inner segment protection group. Example, if operator provisions inner SPG in revertive mode, then segments of outer SPG that share the fate will be also be configured in revertive mode and if operator invalidates the segments in SPG, outer SPG will stop fate-sharing for those segments.

In a another scenario, where Node 3 and Node 5 coincides, that is when inner-work and inner-protect terminate on Node 5 and that Node 3 does not exists, then one end of IPG (the right-hand-side part of inner IPG) is not needed. The right-hand-side part of outer-IPG will be sufficient to perform protection switching using inner and outer entities.

FIG. 4 shows a flow chart of a fate sharing protection switching method for an infrastructure segment between a source node, at least one intermediate node and a destination node of a communication network, wherein the infrastructure segment is co-routed with at least one work or protect infrastructure segment of a Segment Protection Group (SPG), in accordance with one embodiment of the invention.

At step 410, the method monitors the infrastructure segments. The step of monitoring the infrastructure segment is done by various integrity check methods including loss of signal, loss of light, periodic exchange of frames like continuity check messages (CCM as defined in IEEE 802.1ag), etc.

At step 420, the method detects a fault at the infrastructure segment. The detection of fault at the infrastructure segment includes failure of the integrity check methods like absence of periodic frames from the peer nodes, wherein the peer nodes expect specified number of frames within a specified time interval, or loss of signal, etc.

At step 430, the method provisions protection group between the source node and the destination node as outer work and outer protect (Outer Protection Group, OPG), and between at least two intermediate nodes as inner work and inner protect (Inner Protection Group IPG). The Segment Protection Group includes a work segment and a protect segment, wherein the direction of the work and protect segment is a unidirectional or bi-directional.

At step 440, the method further provisions one or more supplementary outer protect on the same port of the OPG nodes where the OPG is provisioned, such that the outer supplementary protect diverge in such a way that mirrors the behavior (or shares the fate) of the inner work and inner protect.

At step 450, the method provisions the IPG in revertive mode, where the IPG in revertive mode triggers the segment of outer SPG to share the fate which is also be configured in revertive mode.

At step 460, the method invalidates the segments in inner SPG triggers outer SPG to stop fate sharing for those invalid segments.

Although the method flowchart includes steps 410-460 that are arranged logically in the exemplary embodiments, other embodiments of the subject matter may execute two or more steps in parallel, using multiple processors or a single processor organized as two or more virtual machines or sub-processors. Moreover, still other embodiments may implement the steps as two or more specific interconnected hardware modules with related control and data signals communicated between and through the modules, or as portions of an application-specific integrated circuit. Thus, the exemplary process flow diagrams are applicable to software, firmware, and/or hardware implementations.

It should also be understood that elements of the present invention may also be provided as a computer program product which may include a machine-readable medium having stored thereon instructions which may be used to program a computer (e.g., a processor or other electronic device) to perform a sequence of operations. Alternatively, the operations may be performed by a combination of hardware and software. The machine-readable medium may include, but is not limited to, floppy diskettes, optical disks, CD-ROMs, and magneto-optical disks, ROMs, RAMs, EPROMs, EEPROMs, magnet or optical cards, propagation media or other type of media/machine-readable medium suitable for storing electronic instructions. For example, elements of the present invention may be downloaded as a computer program product, wherein the program may be transferred from a remote computer or telephonic device to a requesting process by way of data signals embodied in a carrier wave or other propagation medium via a communication link (e.g., a modem or network connection).

FIG. 5 shows one embodiment of a network element 500 that may be configured to implement an embodiment of the invention. The network element may be used to implement one or the another network element on the network. The invention is not limited to a network element configured as illustrated, however, as the invention may be implemented on a network element configured in many different ways. The discussion of the specific structure and methods of operation of the embodiment illustrated in FIG. 5 is intended only to provide one example of how the invention may be used and implemented in a particular instance. The invention more broadly may be used in connection with any network element configured to handle Ethernet frames (i.e. carrying any protocol like 802.1Q or 802.1ad or 802.1 ah etc) in a communications network.

As shown in FIG. 5, the network element 500 generally includes Input/output (I/O) cards 510 configured to connect to links in the communications network. The I/O cards 510 may include physical interfaces, such as optical ports, electrical ports, wireless ports, infrared ports, or ports configured to communicate with other conventional physical media, as well as configurable logical elements capable of operating as MAC (layer 2) ports under the direction of an interface manager, described in greater detail below.

One or more forwarding engines 520 are provided in the network element to process frames received over the I/O cards 510. The forwarding engines 520 forward frames to a switch fabric interface 530, which passes the packets to a switch fabric 540. The switch fabric 540 enables a frame entering on a port on one or more I/O cards 510 to be output at one or more different ports in a conventional manner. A frame returning from the switch fabric 540 is received by one of the forwarding engines 520 and passed to one or more I/O cards 510. The frame may be handled by the same forwarding engine 520 on both the ingress and egress paths. Optionally, where more than one forwarding engine 520 is included in the network element, a given frame may be handled by different forwarding engines on the ingress and egress paths. The invention is not limited to any particular forwarding engine 520, switch fabric interface 530, or switch fabric 540, but rather may be implemented in any suitable network element configured to handle Ethernet frames on a network. One or more Application Specific Integrated Circuits (ASICs) 542, 544 and processors 546, 548 may be provided to implement instructions and processes on the forwarding engines 520. Optionally, a memory 550 may be included to store data and instructions for use by the forwarding engines.

An interface management system 560, optionally containing one or more control cards 564 and one or more data service cards 568, may be provided to create and manage interfaces on the network element. The interface management system may interact with an OAM module 570 locally instantiated on the network element or interfaced to the network element over a management interface port. The OAM module 570 may be implemented in software, firmware, hardware, or in any other manner as discussed in greater detail here. The OAM module 570 is responsible for sending and receiving OAM frames to allow the interface management system 560 to administratively disable one or more of the ports implemented on the I/O cards 510 upon detection of a link failure on the network. Spanning tree software 580 may also be provided to enable the network element to participate in calculating one or more spanning trees to be implemented in the interface region.

When the functions described herein are implemented in software, the software may be implemented as a set of program instructions configured to operate in control logic on a network element that are stored in a computer readable memory within the network element and executed on a microprocessor. For example, in the network element of FIG. 5, the OAM functions may be performed by OAM module 570 implemented as software and executed on a processor associated with the interface manager 560. Likewise, the Segment provisioning and spanning tree functions described herein may be performed by Spanning Tree module 580 and executed on a processor associated with the interface manager 560. However, in this embodiment as with the previous embodiments, it will be apparent to a skilled artisan that all or some of the logic described herein can be embodied using discrete components, integrated circuitry such as an Application Specific Integrated Circuit (ASIC), programmable logic used in conjunction with a programmable logic device such as a Field Programmable Gate Array (FPGA) or microprocessor, or any other device including any combination thereof.

Programmable logic can be fixed temporarily or permanently in a tangible medium such as a read-only memory chip, a computer memory, a computer disk, or other storage medium. All such embodiments are intended to fall within the scope of the present invention.

FIGS. 1-5 are merely representational and are not drawn to scale. Certain portions thereof may be exaggerated, while others may be minimized. FIGS. 1-5 illustrate various embodiments of the invention that can be understood and appropriately carried out by those of ordinary skill in the art.

In the foregoing detailed description of embodiments of the invention, various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus, the following claims are hereby incorporated into the detailed description of embodiments of the invention, with each claim standing on its own as a separate embodiment.

It is understood that the above description is intended to be illustrative, and not restrictive. It is intended to cover all alternatives, modifications and equivalents as may be included within the spirit and scope of the invention as defined in the appended claims. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein," respectively.

I claim:

1. A protection switching method for an infrastructure segment between a source node, at least one intermediate node and a destination node of a communication network, wherein the infrastructure segment is co-routed with at least one work or protect infrastructure segment of a Segment Protection Group (SPG), the method comprising:
   monitoring the infrastructure segments;
   detecting a fault at the infrastructure segment;
   provisioning protection group between the source node and the destination node as outer work and outer protect (Outer Protection Group, OPG), and between at least two intermediate nodes as inner work and inner protect (Inner Protection Group IPG); and
   provisioning at least one supplementary outer protect on the same port of the OPG nodes where the OPG is provisioned, such that the outer supplementary protect diverge in such a way that mirrors the behavior (fate sharing) of the inner work and inner protect,
   invalidating the segments in an inner SPG triggers an outer SPG to stop fate sharing for those invalid segments.

2. The protection switching method of claim 1, further comprising:
   when provisioning the IPG in revertive mode, configuring the segment of outer SPG that mirrors the behavior of the IPG in revertive mode.

3. The protection switching method of claim 1, wherein the Segment Protection Group comprises a work segment and a protect segment, wherein the direction of the work and protect segment on the infrastructure segment between the source node, the at least one intermediate node and the destination node of the communication network is at least one of unidirectional or bi-directional.

4. The protection switching method of claim 1, wherein monitoring of the infrastructure segment further comprises monitoring any of loss of signal, loss of light, and periodic exchange of frames like continuity check messages (CCM as defined in IEEE 802.1ag).

5. The protection switching method of claim 1, wherein detecting of fault at the infrastructure segment further comprises detecting a failure of an integrity check of periodic frames from the peer nodes, wherein the peer nodes expect specified number of frames within any of a specified time interval and loss of signal.

6. A protection switching system of an infrastructure segment, wherein the infrastructure segment is co-routed over with at least one work or protect infrastructure segment of a Segment Protection Group (SPG), the system comprising:
   at least one communication network; and a plurality of nodes connected to each other in the communication network, wherein the plurality of nodes includes a source node, at least one intermediate node and a destination node, wherein each node of the communication network is configured for monitoring the infrastructure segments;

detecting a fault at the infrastructure segment;

provisioning protection group between the source node and the destination node as outer work and outer protect (Outer Protection Group, OPG), and between at least two intermediate nodes as inner work and inner protect (Inner Protection Group IPG); and provisioning at least one supplementary outer protect on the same port of the OPG nodes where the OPG is provisioned, such that the outer supplementary protect diverge in such a way that mirrors the behavior (fate sharing) of the inner work and inner protect, wherein the nodes are further configured for invalidating the segments in an inner SPG triggers an outer SPG to stop fate sharing for those invalid segments.

7. The protection switching system of claim 6, wherein when the nodes are further configured for provisioning the IPG in revertive mode, the segment of outer SPG that mirrors the behavior of the IPG is also configured in revertive mode.

8. The protection switching system of claim 6, wherein the communication network establishing a communication channel between the nodes is a uni-directional link or a bi-directional link, and wherein the plurality of nodes comprise at least one of an IP/MPLS router, ATM switch, Frame Relay, Ethernet Switch, MPLS-TP router, MPLS-TP switch and RPR switch.

* * * * *